Nov. 4, 1924.  
C. GIRL  
1,513,808  
BUMPER SUPPORTING MEANS  
Filed Jan. 28, 1924
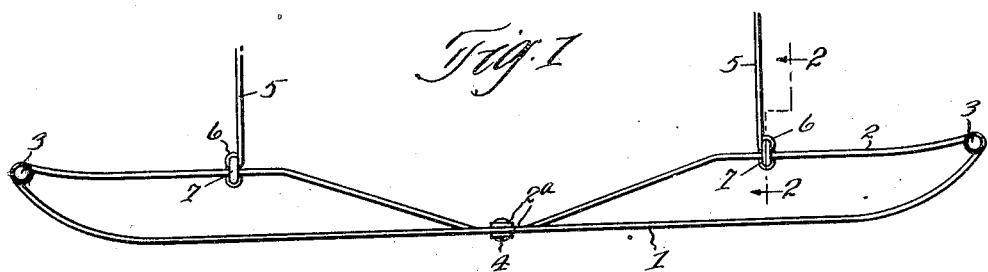
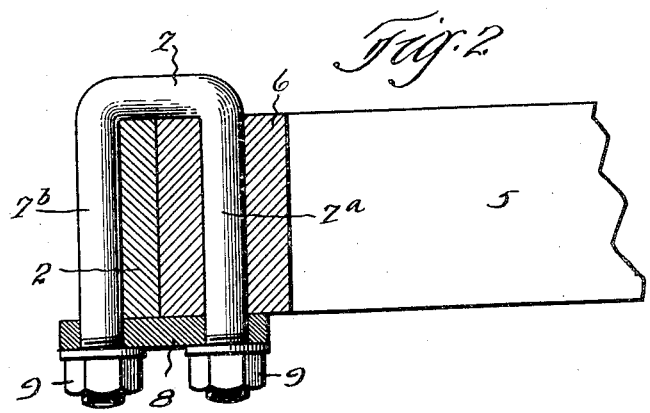
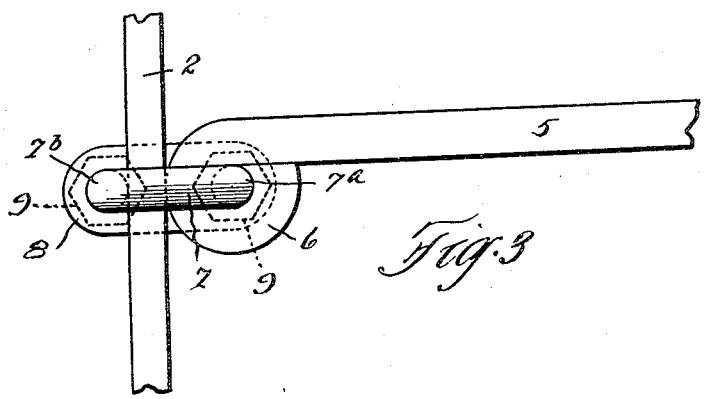
Inventor  
Christian Girl,  
By Hull, Brock & West,  
Attys.

Patented Nov. 4, 1924.

1,513,808

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

BUMPER-SUPPORTING MEANS.

Application filed January 28, 1924. Serial No. 688,977.

*To all whom it may concern:*

Be it known that I, CHRISTIAN GIRL, a citizen of the United States, residing at Detroit, in the county of Wayne and State of Michigan, have invented a certain new and useful Improvement in Bumper-Supporting Means, of which the following is a full, clear, and exact description, reference being had to the accompanying drawings.

This invention relates to bumpers for automobiles, and more particularly to the means for securing such bumpers to the supporting arms therefor. It is the general purpose and object of the invention to provide an extremely cheap and efficient means for mounting a bumper upon the ends of such supporting arms.

I accomplish the foregoing object in and through the construction and arrangement of parts shown in the drawings, wherein Fig. 1 represents a plan view of a bumper and its supporting arms, the bumper being connected to the said arms by means of my invention; Fig. 2 an enlarged detail in section, corresponding to the line 2—2 of Fig. 1; and Fig. 3 a detail in plan of the parts shown in Fig. 2.

Describing the various parts by reference characters, 1 denotes a bar of a bumper. This bumper may be of the type shown in McGregor, 1,372,154, issued March 22, 1921, said bumper comprising a pair of vertically spaced impact bars 1, with a rear bar 2 having its ends pivotally connected to the ends of the bars 1 by bolts 3, the central portion 2ª of the rear bar being projected toward and between the central portions of the bars 1 and connected thereto by the clamping plates 2ª and one or more bolts or rivets 4. So far as my invention is concerned, the particular type of bumper with which it is employed is immaterial except in so far as the bumper affords means by which it may be conveniently connected to the arms 5 in and through the use of such invention.

Each of the arms 5 is connected at its rear or inner end with the side sill or member of an automobile (not shown); and each arm has at its front end an eye 6, the width or height of the eye being the same as the width of the bar 2.

For the purpose of securing the bumper to the arms 5, I employ a pair of inverted U-bolts 7 each having a rear leg 7ª adapted to extend through an eye 6 and a front leg 7ᵇ adapted to bear against the front face of the rear bar 2. The legs 7ª and 7ᵇ are of such length and are so threaded that, when the cross plate 8 is applied to the lower ends thereof, by setting up the nuts 9 the top cross member of the U-bolt will be caused to engage the top of the eye 6 and the top of the plate 2 while the cross plate 8 will be forced against the bottoms of these parts.

When assembled, it will be noted that the rounded forward end of the eye 6 bears against the rear face of the bar 2, and that a pivotal connection is afforded between the bumper and the arms 5.

By the construction shown and described herein, I am enabled to provide an inexpensive but extremely efficient means for pivotally mounting a bumper upon its supporting arms.

Having thus described my invention, what I claim is:—

1. The combination, with a bumper supporting arm having an eye at an end thereof, of a bumper comprising a bar adapted to bear with one face against said eye, a U-bolt extending through said eye and engaging the face of the bumper bar remote from such eye, a cross plate through which the ends of said bolt extend, and nuts on the ends of said bolts.

2. The combination, with a bumper supporting arm having an eye at an end thereof, of a bumper comprising a bar, a U-bolt extending through said eye and engaging the face of the bumper bar remote from such eye, a cross member through which the ends of said bolt extend, and adjustable means on the ends of said bolt for forcing said member against said bar and said eye.

3. The combination, with a bumper supporting arm having an eye at an end thereof, of a bumper comprising a bar adapted to bear with one face against said eye, the said eye and the said bar being of the same width, an inverted U-bolt having one leg thereof extending through said eye and the other leg bearing against the face of said bar which is remote from said eye, a plate mounted on the lower ends of said legs, a nut on the end of each leg adapted to engage said plate, thereby to force the plate upwardly against the bottom of the bar and the bottom of the eye, with the cross member of the bolt engaging the top of said bar and the top of said eye.

4. The combination, with a bumper supporting arm having an eye at an end thereof, of a bumper comprising a bar adapted to bear with one face against said eye, the said eye and the said bar being of the same width, a U-bolt having one leg thereof extending through said eye and the other leg bearing against the face of said bar which is remote from said eye, a plate mounted on the said legs, a nut on the end of each leg adapted to engage said plate and thereby to force the plate against the adjacent edges of the bar and eye, with the cross plate of the bolt engaging the opposite edges of the bar and eye.

In testimony whereof, I hereunto affix my signature.

CHRISTIAN GIRL.